United States Patent [19]

Bengtsson et al.

[11] Patent Number: 4,521,439

[45] Date of Patent: Jun. 4, 1985

[54] BLANCHING PROCESS

[75] Inventors: Bengt L. Bengtsson, Bjuv; Peter Palmlin; Bertil K. Saldert, both of Halsingborg, all of Sweden

[73] Assignee: Nestec, S.A., Vevey, Switzerland

[21] Appl. No.: 587,534

[22] Filed: Mar. 8, 1984

[30] Foreign Application Priority Data

May 4, 1983 [EP] European Pat. Off. ........ 83104381.5

[51] Int. Cl.$^3$ .............................................. A23L 1/00
[52] U.S. Cl. ..................................... 426/509; 426/615
[58] Field of Search ................ 426/509, 510, 615, 506

[56] References Cited

U.S. PATENT DOCUMENTS 3,870,813 3/1975 Filz ...................................... 426/509

FOREIGN PATENT DOCUMENTS 57-208968 12/1982 Japan .................................. 426/615

*Primary Examiner*—George Yeung
*Attorney, Agent, or Firm*—Vogt & O'Donnell

[57] ABSTRACT

A process for blanching vegetables wherein the vegetables are subjected to a first blanching step for a period of from 1 to 30 seconds at a temperature from 90° C. to 100° C. in water or steam and then to a second blanching step for a period of from 1 to 60 minutes at a temperature from 45° C. to 90° C. in water. The vegetables are afterwards frozen.

10 Claims, No Drawings

BLANCHING PROCESS

The present invention relates to a novel blanching process, more particularly to a stepwise blanching process for vegetables.

The texture of frozen vegetables is sometimes inferior to that of fresh vegetables. In particular the texture of some frozen vegetables is seriously softened after cooking. For example, fresh prepared green beans have a crispy and appetising texture, whereas the frozen product, after cooking, has lost the crispness and has a tougher and undesirable texture. In addition, the texture of frozen carrots becomes spongy and tough after cooking and, moreover, gets rather watery owing to the destruction of the cells during the freezing operation.

It is thus desirable to retain the original vegetable quality of the fresh raw material, for example, in vegetable dishes where a long preparation time is necessary i.e. in prepared products such as gratins and boil-in-bag products or in stir-fry products, where vegetables blanched conventionally either in steam or in water at 95°–100° C. for a period of from 1 to 5 minutes are often too soft.

The main factors which influence the texture of frozen vegetables are the blanching, freezing and storage conditions. Although the freezing and storage conditions are more or less optimised now, there is a tendency to over-blanching. The reason for this is a desire to completely inactivate peroxidase, but for many vegetables peroxidase is not the storage-limiting enzyme. This over-blanching leads to texture degradation, flavour and yield losses, and colour deterioration.

It is also known that blanching of vegetables at a low temperature (about 45° C. to 90° C.) for a prolonged period (over 2 minutes) improves the firmness of vegetables but unfortunately causes the discolouration of chlorophyll containing vegetables owing to the degradation of the chlorophyll.

We have found surprisingly that by applying a very short high temperature blanching step followed by a prolonged low temperature blanching step to vegetables, not only is the firmness improved but also the colour of green vegetables is stabilised.

Accordingly, the present invention provides a process for blanching vegetables wherein the vegetables are subjected to a first blanching step for a period of from 1 to 30 seconds at a temperature from 90° C. to 100° C. in water or steam and then to a second blanching step for a period of from 1 to 60 minutes at a temperature from 45° C. to 90° C. in water.

The duration of the first blanching step is preferably from 2 to 25 seconds and especially from 3 to 20 seconds. The temperature of the first blanching step is preferably from 92.5° to 100° C. The duration of the second blanching step is preferably from 3 to 45 minutes and especially from 5 to 40 minutes, e.g., 12 to 40 minutes. The temperature of the second blanching step is preferably from 50° C. to 85° C. and especially from 55° C. to 82.5° C.

Desirably, there is substantially no holding time or chilling procedure between the first blanching step and the second blanching step and conveniently the time between the different blanching operations is as short as possible.

Afterwards, the vegetables are advantageously subjected to a third blanching step at a temperature from 80° C. to 100° C. for a period of time sufficient to obtain the desired inactivation of the enzyme peroxidase. The third blanching step is preferably carried out at a temperature from 85° C. to 100° C. and especially from 90° C. to 100° C. The duration of the third blanching step may conveniently be from 30 seconds to 5 minutes and preferably from 45 seconds to 3 minutes. No chilling step is necessary between the second and third blanching operations and preferably the time between the second and third blanching operations is a short as possible.

Expediently, a texture improver may be added to the vegetables, conveniently at the second blanching step. Suitable texture improvers are the salts of alkali and alkaline earth metals, such as calcium, magnesium, sodium or potassium salts e.g. the chlorides.

After the process of the present invention the vegetables are conveniently chilled in running tap water to about 20° C. before being frozen, for instance, in a blast freezer.

The process of this invention is especially suitable for green vegetables such as green beans, peas, broccoli, broad beans, lima beans, squash, green asparagus, okra, Brussels sprouts, snow peas, green pepper, spinach, green kale, dill, chives and parsley.

The advantages of the process of the present invention are an increased firmness and a retention of the green colour of chlorophyll-containing vegetables when compared with conventional blanching procedures.

The following Examples further illustrate the present invention:

EXAMPLE 1

Greens beans were washed, snipped and cut into 12 mm pieces and then blanched in three successive steps following one another immediately and without any chilling procedure between the different steps. The steps were as follows:
1. 100° C. for 5 seconds in steam
2. 70° C. for 15 minutes in water
3. 100° C. for 1 minute in steam After the last step the product was chilled to 20° C. in running tap water and then frozen in a blast freezer.

Comparative Example A

A batch of green beans was washed, snipped and cut into 12 mm pieces and blanched conventionally at 100° C. for 1 minute in water and frozen. After freeze storage at −30° C. for 1 year the beans were thawed and compared with a batch of thawed beans which had been blanched according to Example 1 and which had also been stored at −30° C. for 1 year. After cooking both batches, the beans of Example 1 had a firmer texture and there was no difference in the flavour and texture of the two batches.

Comparative Example B

A batch of green beans was washed, snipped and cut into 12 mm pieces and blanched at 70° C. for 15 minutes in water. The green beans showed a dull weak green-grey colour compared with the beans blanched by the process of Example 1 which retained the green colour.

EXAMPLE 2

Broccoli was washed, hand-trimmed and cut into stems of 40–50 mm length and then blanched in three successive steps following one another immediately and without any chilling procedure between the different steps. The steps were as follows:
1. 95° C. for 15 seconds in water
2. 60° C. for 30 minutes in water
3. 95° C. for 90 seconds in water After the last step the product was chilled to 20° C. in running tap water and then frozen in a blast freezer.

Comparative Example C

Broccoli was washed, hand-trimmed and cut into stems of 40–50 mm length and then blanched at 100° C. for 90 seconds and frozen. After freeze storage at −30° C. for 1 year the broccoli was thawed and compared with thawed broccoli which had been blanched according to Example 2 and which has also been stored at −30° C. for 1 year. After cooking, the broccoli of Example 2 had a significantly firmer and more desirable texture and there was no significant difference in colour and flavour.

EXAMPLE 3

Brussels sprouts were washed, trimmed and blanched in two steps as follows:
1. 100° C. for 10 seconds in steam
2. 80° C. for 30 minutes in water The sprouts were blanched directly from one temperature to the other without any chilling procedure between. After step 2 the product was chilled to 20° C. in running water and then frozen in a blast freezer.

Comparative Example D

Brussels sprouts were washed, trimmed and blanched conventionally at 100° C. for 5 minutes and frozen. After freeze storage at −30° C. for 1 year the Brussels sprouts were thawed and compared with thawed Brussels sprouts which had been blanched according to Example 3 and which had also been stored at −30° C. for 1 year. After cooking, the Brussels sprouts of Example 3 had a firmer texture and a less sloughed appearance and showed no colour degradation or off-flavour when compared to the conventionally blanched sample.

EXAMPLE 4

Edible podded peas (*Pisum satinum var saccharatum*) were washed, snipped and water blanched in three successive steps following one another immediately and without any chilling procedure between the different steps. The steps were as follows:
1. 100° C. for 5 seconds
2. 60° C. for 5 minutes
3. 100° C. for 1 minute After the last step the product was cooled to 20° C. in running tap water and then frozen in a blast freezer. The peas had a firm texture and a desirable green colour which was apparent immediately after blanching.

Comparative Example E

A similar procedure to that described in Example 4 was followed but in which the blanching procedure comprised a low temperature blanching step at 60° C. for 5 minutes followed by a conventional blanching step at 100° C. for 1 minute. Although the texture of the peas was a good as that of the peas of Example 4, the colour changed during the low temperature blanching step to give an olive-green tint.

EXAMPLE 5

Green beans (*phaselous vulgaris*) were washed, snipped and water blanched in three successive steps following one another immediately and without any chilling procedure between the different steps. The steps were as follows:
1. 100° C. for 5 seconds
2. 60° C. for 5 minutes
3. 100° C. for 1 minute After the last step the product was cooled to 20° C. in running tap water and then frozen in a blast freezer. The green beans had a firm texture and a desirable green colour.

Comparative Example F

A similar procedure to that described in Example 5 was followed but in which the blanching procedure comprised a low temperature blanching step at 60° C. for 5 minutes followed by a short high temperature blanching step at 100° C. for 10 seconds. Although the texture of the beans was as good as that of the beans of Example 5, the colour was inferior as it had an olive-green tint compared with the fresh green colour of the beans of Example 5.

In addition, after freeze storage at −20° C. for 1 year the beans developed a strong off-flavour, while the beans of Example 5 still had an acceptable flavour.

We claim:

1. A process for blanching vegetables comprising subjecting the vegetables to a first blanching step for a period of from 1 to 30 seconds at a temperature from 90° C. to 100° C. in water or steam and then to a second blanching step for a period of from 1 to 60 minutes at a temperature from 45° C. to 90° C. in water.

2. A process according to claim 1 wherein the duration of the first blanching step is from 3 to 20 seconds.

3. A process according to claim 1 wherein the duration of the second blanching step is from 12 to 40 minutes.

4. A process according to claim 1 wherein the temperature of the second blanching step is from 50° C. to 85° C.

5. A process according to claim 1 wherein there is substantially no holding time or chilling procedure between the first and second blanching steps.

6. A process according to claim 1 wherein afterwards the vegetables are subjected to a third blanching step at a temperature from 80° C. to 100° C. for a period of from 30 seconds to 5 minutes.

7. A process according to claim 6 wherein the temperature of the third blanching step is from 90° C. to 100° C.

8. A process according to claim 1 wherein a texture improver is added to the vegetables during the second blanching step.

9. A process according to claim 8 wherein the texture improver is a salt of calcium or magnesium.

10. A process for blanching green vegetables comprising subjecting the green vegetables to a first blanching step for a period of from 1 to 30 seconds at a temperature from 90° C. to 100° C. in water or steam and then to a second blanching step for a period of from 1 to 60 minutes at a temperature from 45° C. to 90° C. in water.

* * * * *